Figure 1:
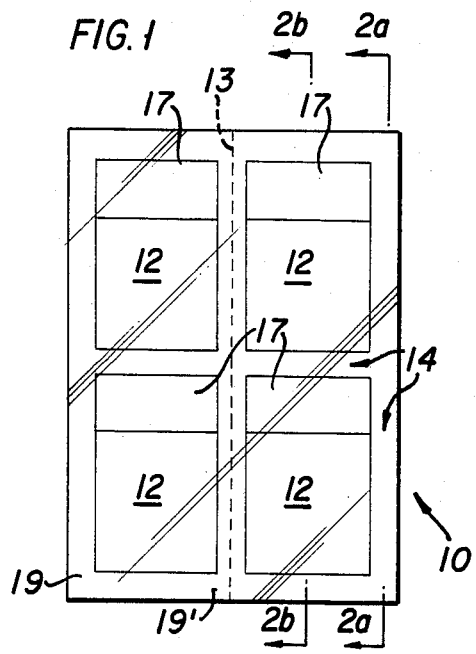

United States Patent [19]

Zaborney

[11] Patent Number: 4,608,323
[45] Date of Patent: Aug. 26, 1986

[54] CELL JACKET

[75] Inventor: John F. Zaborney, Carmel, N.Y.

[73] Assignee: Duracell Inc., Bethel, Conn.

[21] Appl. No.: 709,276

[22] Filed: Mar. 7, 1985

[51] Int. Cl.[4] .............................................. H01M 2/02
[52] U.S. Cl. ..................................... 429/167; 429/176
[58] Field of Search ............... 429/167, 174, 176, 171, 429/152, 162; 206/333

[56] References Cited

U.S. PATENT DOCUMENTS

| | | | |
|---|---|---|---|
| 2,544,115 | 3/1951 | Wagner | 429/171 X |
| 2,700,695 | 1/1955 | Gottschall | 429/176 |
| 3,442,709 | 5/1969 | Hayase | 429/162 X |
| 3,563,805 | 2/1971 | Deierhoi, Jr. | 429/152 |
| 4,087,595 | 5/1978 | Mallery | 429/174 X |
| 4,256,815 | 3/1981 | Smilanich et al. | 429/174 X |
| 4,511,416 | 4/1985 | Karpiloff | 429/176 X |

Primary Examiner—Charles F. LeFevour
Attorney, Agent, or Firm—Ronald S. Cornell

[57] ABSTRACT

A cell jacket comprised of adhered inner and outer protective layers which protect a metallic ink decoration contained therebetween from degradation. The protective layers are adhered to each other substantially completely around the periphery of the metallic ink decoration.

26 Claims, 5 Drawing Figures

U.S. Patent

Aug. 26, 1986

4,608,323

CELL JACKET

This invention relates to decorated jackets for electrochemical cells and particularly alkaline type cells.

Electrochemical cells or batteries sold to the consuming public generally require aesthetically pleasing packaging for greater acceptance. Such cells or batteries are therefore decorated with the insignias, logos or colors of the particular manufacturers for increased consumer recognition. Decorated metal containers provide the greatest impression of quality. However, such containers are heavy, bulky and comprise a considerable portion of the cost of manufacture of the cell or battery. Accordingly there has been an increasing trend toward the utilization of high quality rigid colored plastic containers or jackets such as of ABS or the use of heat shrink plastics such as PVC. The latter provides the advantage of smaller container dimension thereby enabling the packaging of cells with larger amounts of active materials. A problem has however arisen with the utilization of the heat shrink plastics such as PVC when a metallic appearance is desired for cell containers, particularly for cells of the alkaline type. Metallic pigmented inks used to achieve a lustrous metallic container appearance are highly susceptible to degradation or total dissolution by corrosive electrolytes such as alkaline KOH placed within such cells. Though the electrolyte is contained within the cell, such appearance degradation occurs generally during manufacture of the cell when it is being filled with the electrolyte and is immersed in an atmosphere heavily laden with the alkaline electrolyte. In such instances, the highly mobile and corrosive nature of the alkaline electrolyte and sensitivity of the metallic ink are such that even an atmosphere of alkaline electrolyte severely degrades appearances.

One expedient utilized to protect such inks from the corrosive influence of electrolytes such as KOH has involved the procedure of initially preshrinking the PVC jacketing tube to approximate the cell size, externally decorating the PVC tube with the metallized ink and thereafter placing a protective plastic film over the inked decoration and thereafter encasing the cell with the decorated tube. The utilization of separate protective plastic films in conjunction with decorated heat shrink material, aside from being costly, is somewhat ineffective since the highly mobile alkaline electrolyte is capable of wicking between the two separate layers by capillary action. Even a small extent of such wicking is capable of causing an unsightly degradation of appearance of a metallic decoration.

It is an object of the present invention to provide a metallic ink decorated heat shrink cell container or jacket in which the metallic ink is substantially protected from degradation particularly resulting from alkaline electrolytes.

Figure 2A:
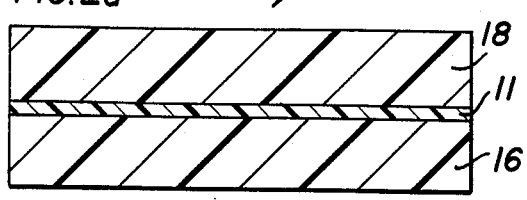
Figure 3:
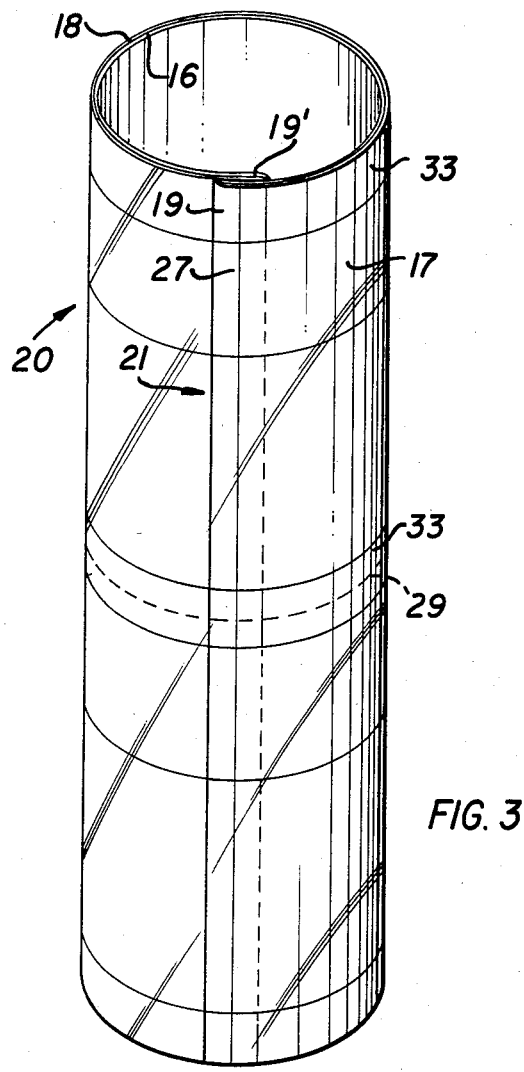
Figure 4:
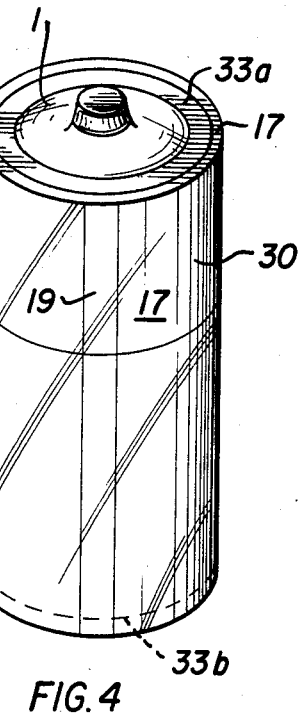

This and other objects, features and advantages of the present invention will become more evident from the following discussion as well as the drawings in which:

FIG. 1 depicts a sheet of metallic decorated material with multiple panels;

FIGS. 2a and b are expanded cross section views of the sheet in FIG. 1 taken along lines a—a and b—b respectively;

FIG. 3 depicts a tube of jacketing material formed from the sheet of FIG. 1; and FIG. 4 depicts a unit of the tube of FIG. 3 as positioned on and heat shrunk onto an alkaline cell.

Generally the present invention comprises a metallic decorated jacket or container for an electrochemical cell and a cell jacketed therewith. The jacket is comprised of an outer protective transparent layer; a layer having a metallic appearing material such as metallic ink, subject to degradation by the cell components, particularly the cell electrolyte; and an inner protective layer adhered to the outer transparent layer with the metallic ink being protectively substantially completely sealingly enclosed between the two layers. Both the inner and outer layers must be substantially if not completely resistant to attack and degradation by cell components such as the corrosive KOH electrolyte used in alkaline cells as well as being impermeable to such corrosive materials. One layer must be a preformed discrete layer upon which the ink is imprinted whereby it functions as a substrate for the inked decoration. The second layer may be applied as a liquid coating layer which solidifies after application to provide the requisite protection or it may be a preformed discrete layer similar to the first layer.

Either or both the inner or outer layer can function as a substrate for the metallic ink decoration. However, it is preferred for manufacturing reasons, with very thin heat shrinkable jackets, that the outer layer serve as the substrate for the ink with the inner layer thereafter being adheringly placed thereon. In any event a protective layer is adheringly placed upon the inked substrate to protectively sealingly enclose the ink therebetween. Such protective layer when placed in the form of very thin adherent coating layers is applied in a manner similar to inking. Such coatings (generally more than one are required) are applied to the inked substrate until an impermeable substantially degradation resistant layer is formed. This layer should extend beyond the inked area on the substrate in all directions to form a sealed enclosure frame around such inked area. Alternatively, when a preformed discrete protective layer is adhered to the inked substrate it should protectively sealingly enclose the inked area therebetween with adhesion directly between the inner and outer layers around the inked area.

In the embodiment wherein a coating is applied to form the protective layer, such coating layer is preferably, in effect, printed upon the inked decoration and on the substrate around the peripheral edges of the inked portion thereby providing the requisite protective enclosure of such inked portion. A preferred protective coating layer is comprised of a colorless vinyl lacquer available from Valspar Corp. which is substantially impervious to alkaline materials such as KOH. Such coating material should be of minimal thickness capable of providing the requisite protection and may be applied by suitable methods such as rotogravure, flexograph, spraying, rolling etc. With the rotogravure type application the coating is applied as a series of densely spaced dots and several coatings are required to ensure that spacings between the dots are fully filled in by the subsequent coatings. Depending upon the space density of the dots and the number of coatings required, the thickness of the coating layer may be effectively reduced to about 5 microns.

A preferred material for use in the preformed discrete inked substrate layer as well as the second preformed discrete layer is a non-plasticized polyvinyl chloride (PVC) resin with heat stabilizers and an impact modifier such as dioctyl phthalate added thereto. Other materials which may be utilized for such preformed discrete inner and outer layers include other forms of PVC, polystyrene, polyethylene, polyester and polyvinyl alcohol.

The jacket is, in a preferred embodiment, comprised of adhered preformed discrete heat shrinkable inner and outer layers placed, in the form of a tube, around an electrochemical cell and then heat shrunk thereon as a decorative jacket therefor. In such embodiment both the inner and outer layers are separate discrete elements and must accordingly be specifically matched in terms of dimension and heat shrink properties such that the heat shrinking does not distort the inked decoration or result in unsightly jacket imperfections such as wrinkles. It is preferred that both the inner and outer layers be comprised of the same material to facilitate matching the shrinkage of both layers. However, if judiciously done the materials of the layers may differ.

With the utilization of a heat shrink tubing, the cell jacket can be made exceedingly thin thereby permitting an increase in the amount of active cell components in standardized cell sizes. The maximum thickness of a preferred jacket is about 80 to 85 microns (about 40 microns for the outer layer, 30 microns for the inner layer and about 10–15 microns for the layer of ink and clear adhesive therebetween). This compares to the thickness of the previously used metal jackets (which provided the requisite metallic decoration) which had thicknesses typically of about 0.010" (about 250 microns). The dimensional thickness of preformed plastic layers may be reduced to about 10 microns each. However greater care in handling such very thin materials is thereby necessitated. The preferred thicknesses described above are particularly suited for automated manufacturing.

Utilization of a protective coating layer permits even further reduction of the jacket thickness and does not require a careful match to the heat shrinking characteristics of the substrate layer. The preformed protective layer however, while being thicker and requiring such careful matching, enhances reliability of degradation resistance and facilitates production of the decorated jacket.

In addition to the protection of the metallic ink provided, the trilayer (metallic ink being enclosed between protective layers) formation permits reduction of the thickness of the transparent outer layer which covers the inked decoration whereby a greater degree of the metallic luster comes through for greater visual impact. This is opposed to direct application of an inked decoration on the inner surface of a relatively thick (for structural integrity) plastic substrate wherein the thickness of the plastic substrate dulls the luster.

Because of the mobile and corrosive nature of alkaline electrolytes, and the high degree of sensitivity of the metallic inks to degradation, and the fact that even slight degradation is highly noticeable, the protective layer should be fully adhered to the inked substrate around the full periphery of each of the inked portions thereof. Thus, when a sheet of the jacketing material is cut to form tubing and individual tubes, there should be no cutting through any of the inked portions (to be used on cells) whereby such ink becomes peripherally exposed. Such peripheral exposure of the inked portion particularly in the presence of an alkaline electrolyte may result in wicking of electrolyte through the ink and the degradation thereof. Furthermore, a peripheral section of the jacket with a laterally exposed ink portion is highly susceptible to separation of the protective layers from each other since adherance in such area is dependent only upon the relatively weak cohesive strength of the ink itself.

Thus, prior art methods of using two heat shrink materials on each other, aside from possible wrinkling, results in the disadvantage of permitting peripheral inked edges to remain open to invasion by the highly mobile alkaline electrolyte. In accordance with the present invention the inner and outer protective layers are adhered to each other substantially completely around the peripheral edges of the inked area such as with an adhesive which is preferably very thin and transparent. An example of such adhesive having particular utility with the preferred PVC layer material is an acetate solvent carrier with a vinyl based adhesive available from the Gilbreth Co. as its solvent adhesive. Alternatively, the layers may be, if carefully done, heat sealed to each other to provide the requisite sealed peripheral enclosure for the inked area with such heat sealing being effected most easily by heated platens.

The adhesive may be applied to either or both of the inner or outer layers but is preferably applied to the uninked layer to avoid possible disruption, by application rollers, of the ink. To facilitate production the adhesive is applied as a continuous layer between the inked substrate and the protective layer. Adhesion between the substrate and the protective layer however is only required in the peripheral area as described. With such procedure wherein the inner layer is the substrate the adhesive must be transparent in order that the metallic decoration be externally visible.

In a preferred embodiment of the present invention the outer layer is the inked substrate and is, of course, transparent in order to permit external visibility of the decorative ink portion. Such transparent layer is of minimal thickness to permit maximum visibility of the luster of the metallic ink. However, such minimal thickness is constrained by the requirement that it serve as a protective layer for the ink and more restrictively that it can feasibly function as an ink substrate in a manufacturing process. Generally, such minimal thickness is about 1.5 mils (about 0.038 mm). The inner protective layer may be thinner since it does not similarly function as the ink carrier in the preferred embodiment. However, the thickness dimension of the inner protective layer is related to that of the outer protective layer whereby they are heat shrinkable at substantially the same rate in order to prevent distortion. As a practical matter, heat application for heat shrinking is most intense on the outer layer where it is directly applied. The inner protective layer has a reduced thickness to compensate for the difference in heat that it receives for shrinking. With an outer layer thickness of 1.5 mils (about 0.038 mm) the thickness of the inner layer is reduced to about 1.25 mils (about 0.032 mm) to provide a uniform shrinkage of the trilayer material.

The metallic ink utilized in the decorative jacket of the present invention is one having an aluminum base since it is such inks which are highly susceptible to degradation. The metallic ink may be applied to the substrate by common methods such as rotogravure, hot stamping and the like. Other types of ink having metallic bases of nickel, chromium, gold and the like are resistant to alkaline electrolytes and would not require the protective layers of the present invention. However, inks made of such metals are extremely costly. Cells have corrosive materials to which such inks are degradable may however utilize the jackets of the present invention to similar effect, providing that the materials which comprise the inner and outer layers are inert to such corrosive materials.

A preferred configuration for the decorative jacket is tubular with the jacket being comprised of a substantially rectangular sheet comprised of a decoration comprising a metallic ink, subject to degradation by a material placed within the cell. The metallic ink is substantially completely enclosed between an outer transparent protective layer and an inner transparent protective layer. The inner and outer protective layers are sealingly adhered to each other in an area substantially completely peripherally surrounding said metallic ink containing decoration whereby a transparent frame surrounds the metallic ink containing decoration. The tube is then formed by overlapping an axial or longitudinal portion of the transparent frame over a portion of the metallic ink containing decoration which is directly adjacent the axial portion of the transparent frame which is parallel to the first axial portion whereby a transparent strip in the jacket decoration, such as would occur by overlapping of the transparent portions alone, is avoided. The overlapping transparent portion is then sealed to the overlapped portion of the metallic ink containing decoration preferably by an adhesive similar to the one which is used to adhere the inner and outer layers together or by heat sealing.

An important advantage of the present invention is that the tubes can formed of many panels to lengths in excess of one thousand meters. The formed tubing is flattened and rolled into a very space efficient roll as compared to prior art metal containers which must be shipped and stored in individual units comprising mostly wasted empty space. When utilization of the jackets of the present invention is desired, the tubes are opened for placement on cells and slit to the proper individual sizes.

Figure 2B:
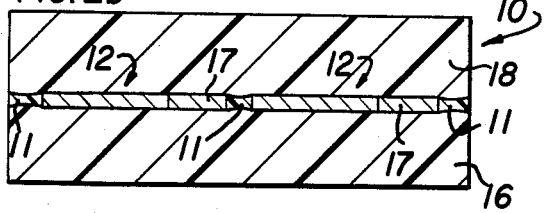

With specific reference to the drawings, FIG. 1 depicts a sheet of material 10 utilized in making the cell jackets of the present invention. The individual decorated portions 12 are completely surrounded by clear frames 14 of plastic. As more readily seen in FIGS. 2a and 2b the material 10 is comprised of two clear plastic layers 16 and 18 which are adhered to each other by clear adhesive 11 (FIG. 2a). In FIG. 2b a layer of metallic ink 17 is shown as being protectively sandwiched between protective layers 16 and 18. In forming the decorative tubing which jackets the cells, sheet 10 is longitudinally or axially cut along the dotted lines in the portion of sheet 10 between adjacent decorated portions 12 whereby an adhered clear frame 13 of the plastic layers 16 and 18 remains around each of the decorated portions 12. Longitudinal clear portion 19 is overlapped over similar and parallel clear portion 19' (on the other side of the decorated portion 12). Clear portion 19 is also partially overlapped, by at least the width thereof, over decorated portion 12 and is adhered to the overlapped areas by a clear adhesive or by heat sealing to form tube 20 with seam 21 shown in FIG. 3 (an overlap of only the clear portions would result in an unsightly clear stripe). Because of the overlap and the formation of seam 21 it is preferred that both layers 16 and 18 be transparent such that the inked segment 27 under seam 21 be clearly visible as part of the jacket decoration. In addition layer 18 shown as the outer layer in tube 20 must be transparent to permit visibility of the inked decoration 12.

Tube 20 is thereafter (or after flattened storage on a roll as described above) cut horizontally or laterally along transparent areas 29 to form the individual jacketing elements 30 shown in FIG. 4 in which the inked decoration 12 remains completely surrounded by frame 33 of adhered layers 16 and 18 (vertical portions of the frame 33 form the seam and are not visible in the finished jacket). Jacketing element 30 is placed around cell container 1 and is heat shrunk thereon as shown. Upper and lower portions 33a and 33b of frame 33 overlap the ends of cell container 1 to complete the decorative jacketing thereof.

It is noted that the decoration need not be completely comprised of the degradation susceptible metallic ink and the entire decoration need not be sealingly peripherally enclosed as long as the metallic portion thereof is in fact enclosed in such manner. It is however preferred for manufacturing purposes and to increase adhesion strength that such sealed peripheral enclosure be around the entire decoration between the undecorated surfaces of both the inner and outer layers. It is additionally noted that it is possible for each of the discrete inner and outer layers to be substrates for portions of the decoration portion and such is also within the purview of the present invention.

It is understood that the above description and the drawings depict embodiments of the present invention and that changes may be made in structure, materials, dimensions, their relative placement and the like without departing from the scope of the present invention as defined in the following claims.

What is claimed is:

1. An electrochemical cell comprising a cell container having a decorative jacket thereon characterized in that said jacket is comprised of a metallic decoration, subject to degradation by a material placed within said cell container, with said metallic decoration being substantially completely enclosed between an outer transparent protective layer and an inner protective layer wherein said outer and inner protective layers are substantially resistant to degradation by said material and are substantially impervious thereto and wherein each of said inner and outer protective layers extends beyond the entire periphery of said metallic decoration and said extensions of said inner and outer protective layers are sealingly adhered to each other in an area substantially completely peripherally surrounding said metallic decoration whereby said metallic decoration is substantially completely enclosed by said inner and outer protective layers.

2. The cell of claim 1 wherein said material is an alkaline electrolyte and said metallic decoration is comprised of a metallic ink comprised of aluminum.

3. The cell of claim 2 wherein one of said inner and outer protective layers is a preformed discrete substrate for said metallic decoration.

4. The cell of claim 3 wherein the other of said inner and outer protective layers comprises a coating adheringly applied to said substrate.

5. The cell of claim 4 wherein said coating is comprised of a vinyl lacquer and said substrate is comprised of polyvinyl chloride.

6. The cell of claim 2 wherein said inner and outer protective layers are each comprised of a preformed discrete plastic layer.

7. The cell of claim 6 wherein said inner and outer layers are adhered by means of an adhesive.

8. The cell of claim 7 wherein said adhesive is comprised of a vinyl based solvent adhesive.

9. The cell of claim 6 wherein said inner and outer layers are adhered by being heat sealed to each other around the periphery of said metallic ink decoration.

10. The cell of claim 6 wherein said inner and outer protective layers are each comprised of a heat shrink plastic material selected from the group consisting of polyvinyl chloride, polystyrene, polyethylene, polyester and polyvinyl alcohol.

11. The cell of claim 10 wherein said inner and outer protective layers are each comprised of unplasticized polyvinyl chloride having a heat stabilizer and an impact modifier added thereto.

12. The cell of claim 1 wherein the maximum thickness of said decorative jacket is about 85 microns.

13. An electrochemical cell comprising a cell container having a tubular decorative jacket thereon characterized in that said tubular jacket is comprised of a substantially rectangular sheet having a decoration comprising a metallic ink, subject to degradation by a material placed within said cell container, with said metallic ink being substantially completely enclosed between an outer transparent protective layer and an inner transparent protective layer, wherein said outer and inner protective layers are substantially resistant to degradation by said material and are substantially impervious thereto, and wherein each of said inner and outer protective layers extends beyond the entire periphery of said metallic decoration and said extensions of said inner and outer protective layers are sealingly adhered to each other, in an area substantially completely peripherally surrounding said metallic ink containing decoration, whereby a transparent frame substantially completely surrounds and encloses said metallic ink containing decoration, with said tube being formed by the overlapping of a first axial portion of said transparent frame over a portion of said metallic ink containing decoration directly adjacent a second axial portion of said transparent frame which is parallel to said first axial portion and the sealing together of said first axial transparent portion to said overlapped portion of said metallic ink containing decoration.

14. A decorative jacket, for an electrochemical cell, comprised of a metallic decoration, subject to degradation by a material placed within said cell, with said metallic decoration being substantially completely enclosed between an outer transparent protective layer and an inner protective layer, wherein said outer and inner protective layers are substantially resistant to degradation by said material and are substantially impervious thereto, and wherein each of said inner and outer protective layers extends beyond the entire periphery of said metallic decoration and said extensions of said inner and outer protective layers are sealingly adhered to each other in an area substantially completely peripherally surrounding said metallic decoration whereby said metallic decoration is substantially completely enclosed by said inner and outer protective layers.

15. The jacket of claim 14 wherein said material is an alkaline electrolyte and said metallic decoration is comprised of a metallic ink comprised of aluminum.

16. The jacket of claim 15 wherein one of said inner and outer protective layers is a preformed discrete substrate for said metallic decoration.

17. The jacket of claim 16 wherein the other of said inner and outer protective layers comprises a coating adheringly applied to said substrate.

18. The jacket of claim 17 wherein said coating is comprised of a vinyl lacquer and said substrate is comprised of polyvinyl chloride.

19. The jacket of claim 15 wherein said inner and outer protective layers are each comprised of a preformed discrete plastic layer.

20. The jacket of claim 19 wherein said inner and outer layers are adhered by means of an adhesive.

21. The jacket of claim 20 wherein said adhesive is comprised of a vinyl based solvent adhesive.

22. The jacket of claim 19 wherein said inner and outer layers are adhered by being heat sealed to each other around the periphery of said metallic ink decoration.

23. The jacket of claim 20 wherein said inner and outer protective layers are each comprised of a heat shrink plastic material selected from the group consisting of polyvinyl chloride, polystyrene, polyethylene, polyester and polyvinyl alcohol.

24. The jacket of claim 23 wherein said inner and outer protective layers are each comprised of unplasticized polyvinyl chloride having a heat stabilizer and an impact modifier added thereto.

25. The jacket of claim 14 wherein the maximum thickness of said decorative jacket is about 85 microns.

26. A tubular decorative jacket, for an electrochemical cell, comprised of a substantially rectangular sheet having a decoration comprising a metallic ink, subject to degradation by a material placed within said cell, with said metallic ink being substantially completely enclosed between an outer transparent protective layer and an inner transparent protective layer, wherein said outer and inner protective layers are substantially resistant to degradation by said material and are substantially impervious thereto, and wherein each of said inner and outer protective layers extends beyond the entire periphery of said metallic decoration and said extensions of said inner and outer protective layers are sealingly adhered to each other, in an area substantially completely peripherally surrounding said metallic ink containing decoration, whereby a transparent frame substantially completely surrounds and encloses said metallic ink containing decoration, with said tube being formed by the overlapping of a first axial portion of said transparent frame over a portion of said metallic ink containing decoration directly adjacent a second axial portion of said transparent frame which is parallel to said first axial portion and the sealing together of said first axial transparent portion to said overlapped portion of said metallic ink containing decoration.

* * * * *